(12) United States Patent
Wang et al.

(10) Patent No.: US 7,919,898 B2
(45) Date of Patent: Apr. 5, 2011

(54) ROTOR CORE ASSEMBLY FOR ELECTRIC MOTOR

(75) Inventors: Weirong Wang, Chesterfield, MO (US); Thomas E. Kirkley, Jr., Caseyville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 517 days.

(21) Appl. No.: 11/766,448

(22) Filed: Jun. 21, 2007

(65) Prior Publication Data

US 2008/0315715 A1     Dec. 25, 2008

(51) Int. Cl.
*H02K 1/06*     (2006.01)

(52) U.S. Cl. ... 310/216.058; 310/216.127; 310/216.131; 310/216.133; 310/216.114; 310/261.1; 310/262

(58) Field of Classification Search ............ 310/217, 310/216, 261, 216.058, 261.1, 216.127, 216.083, 310/216.084, 216.133
See application file for complete search history.

(56) References Cited

U.S. PATENT DOCUMENTS

| | | | | | |
|---|---|---|---|---|---|
| 441,246 | A | * | 11/1890 | Lieb | 310/265 |
| 529,437 | A | * | 11/1894 | Wood | 310/265 |
| 2,064,033 | A | * | 12/1936 | Rose | 310/262 |
| 2,811,923 | A | * | 11/1957 | Barnes | 417/50 |
| 3,447,010 | A | * | 5/1969 | Vreeland | 310/216.127 |
| 4,060,745 | A | * | 11/1977 | Linscott, Jr. | 310/156.22 |
| 4,085,347 | A | * | 4/1978 | Lichius | 310/216.065 |
| 4,250,424 | A | * | 2/1981 | Sento et al. | 310/216.133 |
| 4,306,168 | A | * | 12/1981 | Peachee | 310/400 |
| 4,316,111 | A | * | 2/1982 | Merki et al. | 310/216.058 |
| 4,348,607 | A | * | 9/1982 | Tankred et al. | 310/217 |
| 4,361,953 | A | * | 12/1982 | Peachee | 29/596 |
| 4,486,679 | A | * | 12/1984 | Jones | 310/407 |
| 4,503,604 | A | * | 3/1985 | Rediger | 29/596 |
| 4,745,314 | A | * | 5/1988 | Nakano | 310/57 |
| 4,765,054 | A | * | 8/1988 | Sauerwein et al. | 29/596 |
| 4,937,486 | A | * | 6/1990 | Schwanda | 310/269 |
| 4,965,482 | A | * | 10/1990 | Ohnishi et al. | 310/323.13 |
| 5,091,668 | A | * | 2/1992 | Cuenot et al. | 310/156.61 |
| 5,704,111 | A | * | 1/1998 | Johnson et al. | 29/598 |

(Continued)

FOREIGN PATENT DOCUMENTS

JP     2007329150 A  *  12/2007

OTHER PUBLICATIONS

ABE Specialty Fastening Solutions, POP Blind Fasteners web page, printed from http://www.aboveboardelectronics.com/popmain.htm on Mar. 21, 2007, 2 pages, dated 2004.

(Continued)

*Primary Examiner* — Quyen Leung
*Assistant Examiner* — Alex W Mok
(74) *Attorney, Agent, or Firm* — Senniger Powers LLP

(57) ABSTRACT

A rotor core assembly for an electric motor includes a stack of laminations and first and second end plates disposed at opposite ends of the stack of laminations. A plurality of concentric fastener holes extend through the laminations and the end plates for receiving stainless steel pins. Each pin has a head against one of the end plates, and each pin has spaced apart grooves thereon extending from the other end plate. A stainless steel collar engages each of the pins and contacts one of the end plates. Each collar has a deformed portion in at least one of the grooves of the pin.

20 Claims, 3 Drawing Sheets

U.S. PATENT DOCUMENTS

| | | | |
|---|---|---|---|
| 5,833,440 A * | 11/1998 | Berling | 417/418 |
| 5,880,547 A * | 3/1999 | Shoykhet | 310/91 |
| 5,894,183 A * | 4/1999 | Borchert | 310/216.013 |
| 5,894,654 A * | 4/1999 | Varis et al. | 29/598 |
| 6,023,838 A * | 2/2000 | Yamakoshi et al. | 29/596 |
| 6,047,460 A | 4/2000 | Nagate et al. | |
| 6,104,116 A * | 8/2000 | Fuller et al. | 310/216.124 |
| 6,147,428 A * | 11/2000 | Takezawa et al. | 310/156.57 |
| 6,177,750 B1 * | 1/2001 | Tompkin | 310/261 |
| 6,537,005 B1 | 3/2003 | Denham | |
| 6,741,010 B2 * | 5/2004 | Wilkin | 310/268 |
| 6,769,167 B2 | 8/2004 | Lee et al. | |
| 6,918,724 B2 | 7/2005 | Eriksson | |
| 6,969,939 B1 * | 11/2005 | Swensrud et al. | 310/201 |
| 7,019,427 B2 | 3/2006 | Sasaki et al. | |
| 2004/0061390 A1 | 4/2004 | Baker-Bachman et al. | |
| 2005/0145428 A1 * | 7/2005 | Chun et al. | 180/209 |
| 2005/0285468 A1 * | 12/2005 | Fukushima et al. | 310/156.53 |
| 2006/0016947 A1 | 1/2006 | Capozzi et al. | |
| 2008/0231138 A1 * | 9/2008 | Onimaru et al. | 310/217 |

OTHER PUBLICATIONS

Textron Fastening Systems, Blind Fasteners web page, printed from http://www.textronfasteningsystems.com/database/blind/bldfst.html on Mar. 21, 2007, 17 pages, at least as early as Mar. 21, 2007.

* cited by examiner

US 7,919,898 B2

ROTOR CORE ASSEMBLY FOR ELECTRIC MOTOR

FIELD OF THE INVENTION

The invention relates generally to electric motors and more particularly to rotor core assemblies for electric motors.

BACKGROUND OF THE INVENTION

Conventional rotor core assemblies in electric motors include components, such as laminations and end plates, that must be securely fastened together to prevent damage to the rotor and to the motor during rotation. If the components loosen, the core may become unbalanced, causing the motor to stop or vibrate. And if the motor is to be used for high-speed applications, e.g., speeds greater than about 7000 rpm, it becomes even more critical that the components are securely fastened together if the motor fails.

Conventional high-speed rotor cores are manufactured using adhesives because adhesives tend to form a secure bond between the components that lasts the life of the motor. Rivets do not have sufficient clamping force, and threaded bolts may loosen over the life of the motor. Additionally, bolts made of stainless steel are known to expand at a much greater rate than steel bolts, so their use is disfavored in motors because they may allow the laminations to loosen. Thus, mechanical fasteners in rotor cores are typically avoided in high-speed applications to minimize loosening of components. Moreover, such mechanical fasteners are known to negatively impact operation of the motor, as by disturbing the magnetic flux path and causing unwanted eddy currents.

The process of making a rotor core using adhesive as a fastener is relatively expensive. For example, the adhesive must be cured for more than an hour, which makes the process very time-consuming. Accordingly, a rotor core and motor that solves the shortcomings of the prior art is needed.

SUMMARY OF THE INVENTION

In one aspect, a rotor core assembly for an electric motor includes a stack of laminations and first and second end plates disposed at opposite ends of the stack of laminations. A concentric central shaft opening extends through the laminations and the end plates, and a rotor shaft is received in the opening. A plurality of concentric fastener holes extend through the laminations and the end plates for receiving stainless steel pins. Each pin has a head against one of the end plates, and each pin has spaced apart grooves thereon extending from the other end plate. A stainless steel collar engages each of the pins and contacts one of the end plates. Each collar has a deformed portion in at least one of the grooves of the pin.

In another aspect, an electric motor comprises a stator and a rotor in magnetic coupling relation with the stator. The rotor includes a stack of laminations in which each lamination is in contact with at least one other lamination. A concentric central shaft opening extends through the laminations and the end plates, and a rotor shaft is received in the opening. Each pin has a head against a first of the end plates, and each collar engages one of the pins and contacts the second end plate.

In still another aspect, the motor includes a plurality of stainless steel locking fastener sets. Each set includes a pin extending through one of the fastener holes and a stainless steel collar that locks onto the pin. Each fastener set clamps the stack of laminations and end plates with a force of at least about 900 pounds to prevent loosening.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Corresponding reference characters indicate corresponding parts throughout the drawings.

DETAILED DESCRIPTION OF THE DRAWINGS

Figure 1:
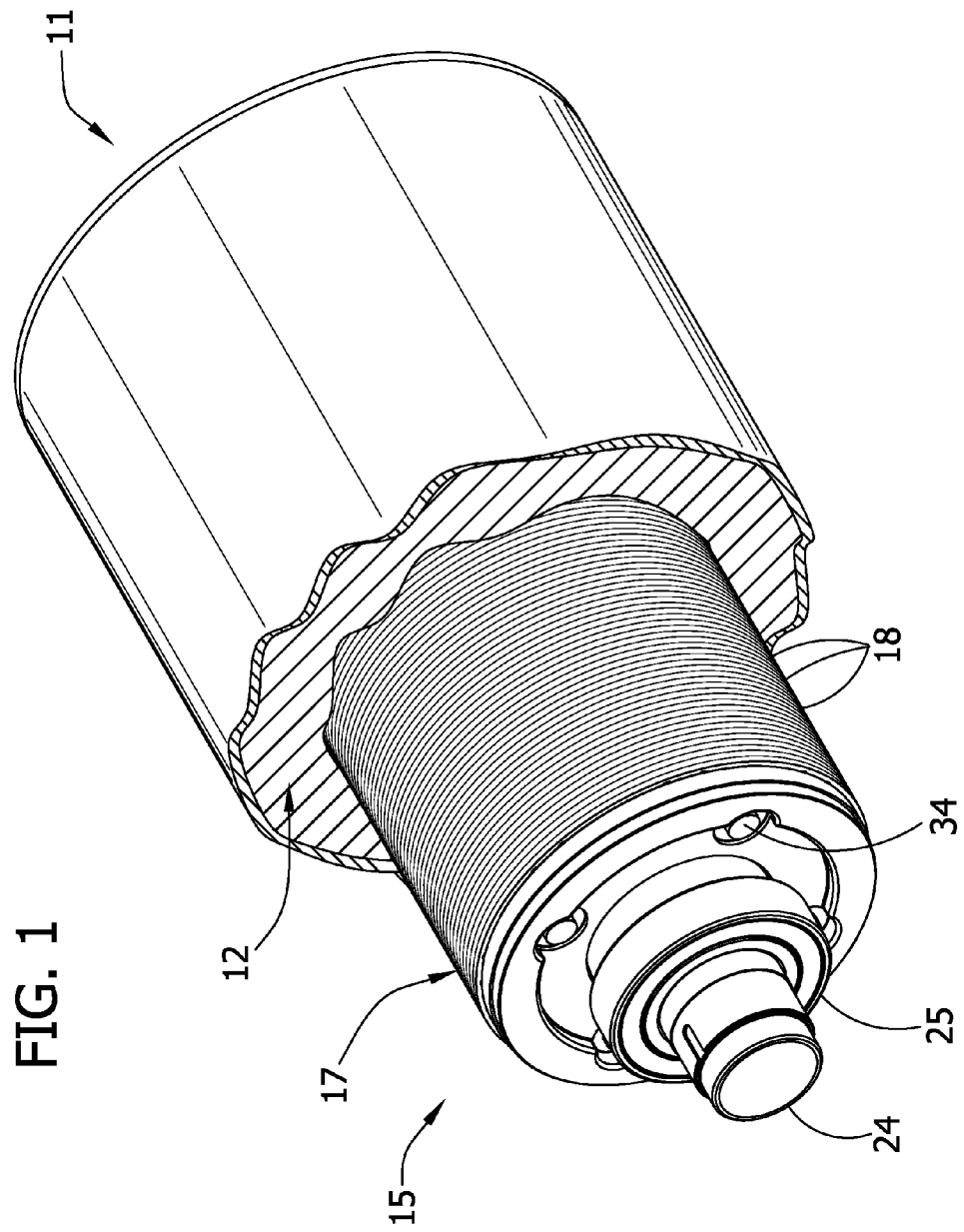
FIG. 1 is a perspective of a motor of one embodiment, with portions of the motor cutaway to show a rotor core assembly.
Figure 2:
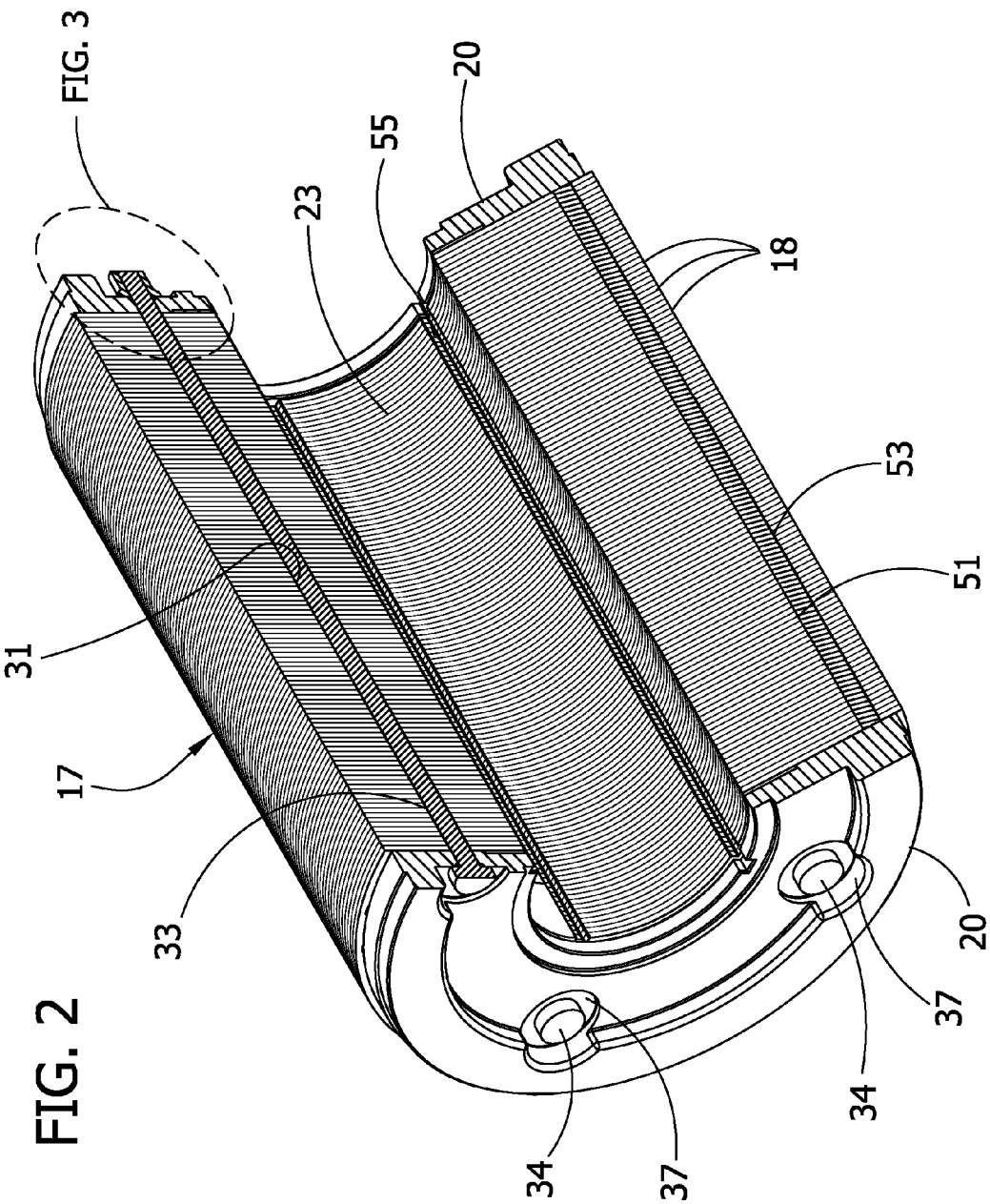
FIG. 2 is a perspective section view of the rotor core assembly of the motor.

Referring to FIGS. 1-2, a motor of one embodiment of the invention is generally designated 11. The motor generally includes a stator 12 and a rotor 15 in magnetic coupling relation with the stator. Other details of construction may vary and need not be shown or described herein because they will be understood by those of ordinary skill in the art. These elements may have other shapes and configurations within the scope of the embodiments of the invention. The motor 11 may suitably be used in high-speed applications such as automotive applications. Many other applications for the motor are contemplated within the scope of the embodiments of the invention.

The rotor 15 includes a rotor core assembly (generally designated 17) including a stack of laminations 18. End plates 20 are disposed at opposite ends of the stack of laminations 18. A central shaft opening 23 extends through the laminations 18 and the end plates 20 and receives a rotor shaft 24 with bearings 25 mounted thereon. The central shaft opening 23 is concentric with the laminations 18. The rotor core 17 of this embodiment is generally cylindric as shown, though other shapes are contemplated. Elements of the rotor core 17 may be made of any ferromagnetic material, including powdered metal, among other possible materials. The rotor core 17 may be made of stacked individual stampings or laminations as shown or of a turned solid (e.g., iron).

Figure 3:
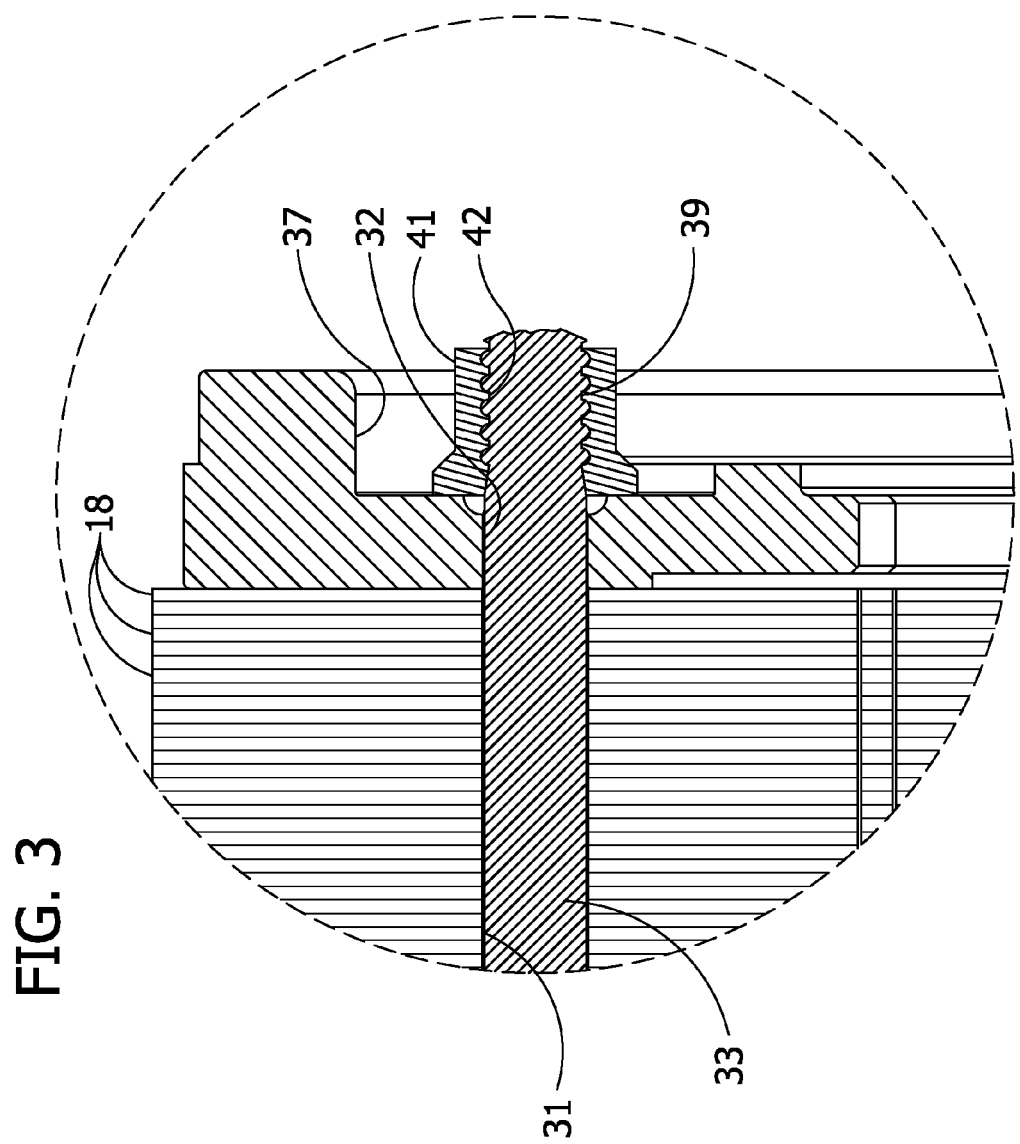
FIG. 3 is an enlarged view of a portion of FIG. 2 showing a lock fastener.

Referring to FIGS. 2-3, the laminations 18 and end plates 20 respectively include a plurality of coaxial fastener holes 31, 32 extending therethrough. Each of the holes 31, 32 receives one of a plurality of stainless steel pins 33. A head 34 of each pin contacts one of the end plates 20, and the end plates may include counterbores 37 as shown to receive each head. Each pin 33 extends all the way through the rotor core 17 and protrudes from the other of the end plates 20 (FIG. 3). Each pin 33 of this embodiment has spaced-apart, circumferential grooves 39 (non-helical, non-threading) near its end. The portion of the pin 33 protruding from the plate 20 has the grooves thereon. One of a plurality of stainless steel collars 41 is received over and engages one of the pins 33, the pin and collar being a locking fastener set of this embodiment. The collar 41 also contacts the end plate 20. Each collar has a deformed portion 42 in at least one of the grooves 39 of the pin 33 (FIG. 3) so that the collar cannot loosen on the pin. In this embodiment, each pin 33 and collar 41 combination exerts a clamping force of at least about 900 pounds on the end plates 20, in some embodiments about 1000 pounds. In this embodiment, there are four fastener sets, though more or less fasteners are contemplated.

The laminations 18 of this embodiment also include holes 51 for receiving buried magnets 53 within the rotor core 17. The laminations may also include other holes, e.g., for weight reduction, and slots 55 as shown in FIG. 2.

The motor 11 and rotor core 17 are adapted to rotate the shaft 24 at a speed of at least about 7000 rpm, or even at least about 10,000 rpm. The motor 11 of this embodiment is suitable to be made in relatively large sizes, e.g., from about 9 inches to about 10 inches, and suitable for use in hybrid gas-electric automobiles or in fuel cell-powered automobiles.

In one method of assembly generally described herein, a clamping tool (not shown) is used to assemble the rotor core 17. One of the end plates 20 is placed on a clamping plate and a stacking arbor of the clamping tool. Laminations 18 are placed or stacked on the end plate 20, the laminations being oriented so that the respective central shaft hole, fastener holes and magnet holes are aligned. After all the laminations are stacked on the end plate, the other end plate is placed on top of the stack, along with another clamping plate. Clamping bolts extend through the clamping plates, and nuts on the bolts are tightened to compress the lamination stack. The pins are inserted into the fastener holes so that the heads are in contact with one of the end plates, and then collars are placed over the protruding end of the pins so that the collars are in contact with the other of end plates. (In an alternative embodiment, the pins may be oriented in different directions, whereby some heads are in contact with one end plate and other heads are in contact with the other end plate.) A tool (not shown) may be used to pull each pin end longitudinally to tension the pin, and the tool may simultaneously secure the collar on the pin. The collar is secured by deforming, e.g., compressing the collar, so that portions of the collar are forced into the grooves in the pin. The method according to one embodiment causes a clamping force by the fastener set on the plates of at least about 900 pounds, or at least about 1000 pounds. The pin may include one or more large grooves disposed outside the collar so that the end of the pin extending beyond the collar may be broken off after the collar is deformed. This breaking operation may be performed by the same tool and in the same general operation as the pulling and deforming steps.

One exemplary stainless steel pin and collar set is a Textron Brazier HD Stainless Steel 6 Groove Extra Long Avdelok pin and collar set available from Textron of Providence, R.I. As noted above, the pin has spaced-apart, concentric grooves (not helical threads) thereon for receiving a portion of the collar when the collar is deformed into engagement with the pin. Other stainless steel fastener sets are contemplated within the scope of the embodiments of the invention.

In one method of balancing the rotor 15, material may be removed from one or both of the end plates 20 until the rotor is balanced. Separate balancing weights or rings may also be added within the scope of the embodiments of the invention.

Contrary to conventional teaching, the rotor core includes mechanical fasteners in a core suitable for use in high-speed applications. The locking fastener set shown herein is not threaded together so that the collar of the fastener cannot loosen, in contrast to a conventional bolt/nut arrangement. Also, the fastener set has sufficient clamping force to prevent loosening, unlike standard rivets. In this way, the collar will not loosen and cause vibration or damage to the core assembly. Also contrary to conventional teaching, the applicants found that a stainless steel fastener, though it does expand when heated at a greater rate than steel, can be used if the fastener has sufficient clamping force. In other words, the stainless steel fastener, if it has sufficient clamping force, prevents the laminations from loosening even though the fastener expands significantly more than non-stainless steel when heated. The example locking fastener shown herein is usable (where a conventional rivet could not be used) because the lock fastener has greater clamping force and can better withstand lengthening of the bolt when the motor is heated. The stainless steel material of the fastener eliminates any possibility of disturbing the magnetic flux path and unnecessary Eddy current.

When introducing elements of various aspects of the present invention or embodiments thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top" and "bottom", "front" and "rear", "above" and "below" and variations of these and other terms of orientation is made for convenience, but does not require any particular orientation of the components.

As various changes could be made in the above constructions, methods and products without departing from the scope of the embodiments of the invention, it is intended that all matter contained in the above description or shown in the accompanying drawings shall be interpreted as illustrative and not in a limiting sense. Further, all dimensional information set forth herein is exemplary and is not intended to limit the scope of the embodiments of the invention.

What is claimed is:

1. A rotor core assembly for an electric motor, the core assembly having a first end and a second end, the core assembly comprising:
   a stack of laminations,
   end plates disposed at opposite ends of the stack of laminations,
   a central shaft opening extending through the laminations and the end plates,
   a rotor shaft received in the opening,
   a plurality of fastener holes extending through the laminations and the end plates,
   a plurality of stainless steel pins, each pin extending through one of the fastener holes,
   each pin having a head positioned against one of the end plates,
   each pin having spaced apart grooves thereon extending from the other end plate, and
   a plurality of stainless steel collars, each collar engaging one of the pins and contacting the other end plate, each collar having a deformed portion in at least one of the grooves of the pin.

2. The rotor core assembly of claim 1 wherein the grooves are non-helical.

3. The rotor core assembly of claim 1 wherein the rotor core assembly is adapted to rotate the shaft at a speed of at least about 7000 rpm.

4. The rotor core assembly of claim 1 wherein the rotor core assembly is adapted to rotate the shaft at a speed of at least about 10,000 rpm and the pins and collars are adapted to exert sufficient clamping force on the stack of laminations to prevent damage to the rotor core assembly from operation at said speed.

5. The rotor core assembly of claim 1 wherein each pin and collar exerts a clamping force of at least about 900 pounds on the end plates.

6. The rotor core assembly of claim 1 wherein the laminations include magnet holes for receiving magnets, and wherein the assembly further comprises magnets positioned in the magnet holes.

7. The rotor core assembly of claim 1 wherein there are four fastener holes, four pins and four collars.

8. An electric motor comprising:
a stator,
a rotor in magnetic coupling relation with the stator and including:
  a stack of laminations in which each lamination is in contact with at least one other lamination,
  first and second end plates disposed at opposite ends of the stack of laminations,
  a central shaft opening extending through the laminations and the end plates,
  a rotor shaft received in the opening,
  a plurality of fastener holes extending through the laminations and the end plates,
  a plurality of stainless steel pins, each pin extending through one of the fastener holes,
  each pin having a head against a first of the end plates,
  each pin having spaced apart grooves thereon extending from the second end plate, and
  a plurality of stainless steel collars, each collar engaging one of the pins and contacting the second end plate, each collar having a deformed portion in at least one of the grooves of the pin.

9. The motor of claim 8 wherein the grooves are non-helical.

10. The motor of claim 9 wherein the rotor is adapted to rotate the shaft at a speed of at least about 7000 rpm and the pins and collars are adapted to exert sufficient clamping force on the stack of laminations to prevent damage to the rotor resulting from operation at said speed.

11. The motor of claim 9 wherein the rotor is adapted to rotate the shaft at a speed of at least about 10,000 rpm.

12. The motor of claim 11 wherein each pin and collar exerts a clamping force of at least about 900 pounds on the end plates.

13. The motor of claim 12 wherein the laminations include magnet holes for receiving magnets, and wherein the motor further comprises magnets positioned in the magnet holes.

14. The motor of claim 13 wherein there are four fastener holes, four pins and four collars.

15. The motor of claim 8 wherein the motor is adapted to rotate the drive shaft of an automobile at a speed of at least about 7000 rpm.

16. An electric motor comprising:
a stator,
a rotor in magnetic coupling relation with the stator and including:
  a stack of laminations in which each lamination is in contact with at least one other lamination,
  first and second end plates disposed at opposite ends of the stack of laminations,
  a central shaft opening extending through the laminations and the end plates,
  a rotor shaft received in the opening,
  a plurality of fastener holes extending through the laminations and the end plates, and
a plurality of stainless steel locking fastener sets, each set including a pin extending through one of the fastener holes and a stainless steel collar that locks onto the pin, each fastener set clamping the stack of laminations and end plates with a force of at least about 900 pounds.

17. The motor of claim 16 wherein each pin includes non-helical grooves.

18. The motor of claim 17 wherein the rotor is adapted to rotate the shaft at a speed of at least about 7000 rpm and the fastener sets are adapted to exert sufficient clamping force on the stack of laminations to prevent damage to the rotor resulting from operation at said speed.

19. The motor of claim 18 wherein the laminations include magnet holes for receiving magnets, and wherein the assembly further comprises magnets positioned in the magnet holes.

20. The motor of claim 16 wherein the motor is adapted to rotate the drive shaft of an automobile at a speed of at least about 7000 rpm.

* * * * *